(12) United States Patent
Gao et al.

(10) Patent No.: US 11,521,422 B2
(45) Date of Patent: Dec. 6, 2022

(54) METHOD AND DEVICE FOR DETECTING BODY TEMPERATURE, ELECTRONIC APPARATUS AND STORAGE MEDIUM

(71) Applicant: Baidu Online Network Technology (Beijing) Co., Ltd., Beijing (CN)

(72) Inventors: Shupeng Gao, Beijing (CN); Jie Ma, Beijing (CN); Yuhang Liu, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 302 days.

(21) Appl. No.: 16/872,462

(22) Filed: May 12, 2020

(65) Prior Publication Data
US 2021/0286974 A1    Sep. 16, 2021

(30) Foreign Application Priority Data

Mar. 10, 2020 (CN) .......................... 202010163118.1

(51) Int. Cl.
| | |
|---|---|
| *G06V 40/16* | (2022.01) |
| *G01J 5/00* | (2022.01) |
| *G06T 7/00* | (2017.01) |

(52) U.S. Cl.
CPC .......... *G06V 40/161* (2022.01); *G01J 5/0025* (2013.01); *G06T 7/0002* (2013.01);
(Continued)

(58) Field of Classification Search
CPC .. G06V 40/161; G06V 40/171; G06V 40/172; G01J 5/0025; G01J 2005/0077;
(Continued)

(56) References Cited

U.S. PATENT DOCUMENTS

| 7,340,293 B2 * | 3/2008 | McQuilkin | ............... G01J 5/53 374/129 |
| 2004/0242976 A1 * | 12/2004 | Abreu | .................... A61B 5/746 600/315 |

(Continued)

FOREIGN PATENT DOCUMENTS

| CN | 105852819 A | 8/2016 |
| CN | 107679504 A | 2/2018 |

(Continued)

OTHER PUBLICATIONS

Korean Intellectual Property Office; Korean Office Action; Korean Application No. 10-2020-0058317; dated Oct. 15, 2021; 11 pages.
(Continued)

*Primary Examiner* — Santiago Garcia
(74) *Attorney, Agent, or Firm* — Faegre Drinker Biddle & Reath LLP (57) ABSTRACT

A method and device for detecting a body temperature, electronic apparatus and storage medium are provided, which relate to the field of infrared temperature measurement. The method includes: performing face recognition on an optical static image, to determine at least one face image in the optical static image and coordinates of the face image; performing coordinate transformation on a thermal imaging static image and/or the optical static image, to determine thermal imaging information of the face image, wherein the optical static image and the thermal imaging static image include a same image acquisition target with a same face; and determining a body temperature corresponding to the face image, according to the thermal imaging information of the face image. in the embodiment of the present application, efficiency of body temperature detection in public places can be improved and cross infection can be prevented.

17 Claims, 6 Drawing Sheets

(52) U.S. Cl.
CPC .......... *G06V 40/171* (2022.01); *G06V 40/172* (2022.01); *G01J 2005/0077* (2013.01); *G06T 2207/10016* (2013.01); *G06T 2207/10048* (2013.01); *G06T 2207/30168* (2013.01); *G06T 2207/30201* (2013.01)

(58) Field of Classification Search
CPC ......... G06T 7/0002; G06T 2207/10016; G06T 2207/10048; G06T 2207/30168
See application file for complete search history.

(56) References Cited

U.S. PATENT DOCUMENTS

| | | | | |
|---|---|---|---|---|
| 2007/0153871 | A1* | 7/2007 | Fraden | A61B 5/015 374/121 |
| 2008/0154138 | A1* | 6/2008 | McQuilkin | G01J 5/0025 600/549 |
| 2009/0105605 | A1* | 4/2009 | Abreu | H04N 5/2256 600/549 |
| 2015/0062346 | A1* | 3/2015 | Fraden | H04N 5/332 348/164 |
| 2015/0094914 | A1* | 4/2015 | Abreu | B60H 1/00742 701/1 |
| 2015/0148681 | A1* | 5/2015 | Abreu | A61B 5/6821 600/474 |
| 2017/0245762 | A1* | 8/2017 | Kakileti | B25J 19/023 |
| 2017/0344833 | A1* | 11/2017 | Ahlberg | G06V 20/52 |
| 2019/0057262 | A1* | 2/2019 | Sai | G08G 1/165 |
| 2019/0323895 | A1* | 10/2019 | Kostopoulos | G01J 5/0265 |
| 2020/0146557 | A1* | 5/2020 | Cheung | G06V 20/53 |

FOREIGN PATENT DOCUMENTS

| | | |
|---|---|---|
| CN | 108700468 A | 10/2018 |
| CN | 109215806 A | 1/2019 |
| CN | 109846463 A | 6/2019 |
| CN | 110044486 A | 7/2019 |
| CN | 110160670 A | 8/2019 |
| CN | 110332995 A | 10/2019 |
| CN | 110580452 A | 12/2019 |
| JP | 2010079446 A | 4/2010 |
| JP | 2016103786 A | 6/2016 |
| JP | 2017517076 A | 6/2017 |
| JP | 2018183564 A | 11/2018 |
| KR | 10-1729327 A | 4/2017 |
| KR | 20180123900 A | 11/2018 |
| KR | 20190052870 A | 5/2019 |
| WO | 2010064405 A1 | 6/2010 |
| WO | 2017209089 A1 | 12/2017 |
| WO | 2016770984 A1 | 3/2018 |
| WO | 2018079031 A1 | 9/2019 |

OTHER PUBLICATIONS

Korean Intellectual Property Office; Korean Office Action; Korean Application No. 10-2020-0058317; dated Apr. 11, 2022; 11 pages.
Notice of Reasons for Refusal, Japanese Patent Application No. 2020-085188, Japanese Intellectual Property Office, dated Aug. 18, 2020, 8 pages (with English translation).
"Thermo camera system that detects up to 16 body temperatures at the same time by face recognition by non-contact", https://it.impress.co.jp/articles/-/19330, 2020, (2 pages).
"Used for face recognition advanced countries, China and Uygur monitoring Export to developing countries", https://www.sankei.com/module/print/index.html, 2018, (2 pages).
Office Action Machine Translation, Japanese Patent Application 2020-085188, dated Jun. 9, 2020, 7 pages.
European Search Report to App. 20173714.5-1207, Baidu Online Network Technology (Beijing) Co., Ltd., European Patent Office, dated Nov. 2, 2020, 39 pages.
Jorgen Ahlberg et al., "Multi-person fever screening using a thermal and a visual camera," Human-Oriented Technologies Laboratory, Faculty of Electrical Engineering and Computing, University of Zagreb, Croatia, 2015, 4 pages.
The State Intellectual Property Office of People's Rebulic of China; Chinese Office Action and Search Report; Chinese Application No. 2020101631181; dated Feb. 14, 2022; 17 pages.
Horoki Yoshikawa et al., Deep for daily life using simple thermography based on machine learning proposal of body temperature estimation method, multimedia, distributed cooperation and mobile symposium 2017 theory, Bunshu, Jun. 31, 2017, pp. 1396-1403, <URL:https://ipsj.ixsq.nii.ac.jp/ej/?action=repository_uri&item_id=190206&file_id=1&file_no=>.

* cited by examiner

METHOD AND DEVICE FOR DETECTING BODY TEMPERATURE, ELECTRONIC APPARATUS AND STORAGE MEDIUM

CROSS-REFERENCE TO RELATED APPLICATION

This application claims priority to Chinese Patent Application No. 202010163118.1, filed on Mar. 10, 2020, which is hereby incorporated by reference in its entirety.

TECHNICAL FIELD

This application relates to the field of thermal imaging, and in particularly, to the field of infrared temperature measurement.

BACKGROUND

At present, in the case where temperatures of a large number of people is required to be measured in a public place, a device such as a forehead thermometer is generally used to detect individuals one by one. Thus, this method has a low detection efficiency, and contact with the detection device may cause cross infection.

SUMMARY

A method and device for detecting a body temperature, an electronic apparatus and a storage medium are provided according to embodiments of the present application, so as to at least solve the technical problems above in the existing technology.

In a first aspect, a method for detecting a body temperature is provided according to an embodiment of the application, which includes:

performing face recognition on an optical static image, to determine at least one face image in the optical static image and coordinates of each of the face image;

performing coordinate transformation on a thermal imaging static image and/or the optical static image, to determine thermal imaging information of the face image, wherein the optical static image and the thermal imaging static image include a same image acquisition target with a same face; and determining a body temperature corresponding to the face image, according to the thermal imaging information of the face image.

In the embodiment of the present application, body temperatures corresponding to multiple face images is determined by determining multiple face images in an ordinary optical image and determining the thermal imaging information corresponding to the face images, in the thermal imaging image, thereby improving efficiency of body temperature detection in public places and preventing cross infection.

In an implementation, the method further includes:

extracting frames at a same moment from an optical video image and a thermal imaging video image respectively, to obtain the optical static image and the thermal imaging static image.

In the embodiment of the present application, by selecting a static image from a video image, it is convenient to select a static image with higher quality for body temperature detection In an implementation, the performing face recognition on an optical static image, to determine at least one face image in the optical static image and coordinates of each of the face image includes:

determining image quality of the optical static image according to sharpness of the optical static image and face sharpness in the optical static image, wherein the face sharpness includes at least one of following characteristics: blocking degree, ambiguity, light intensity, attitude angle, completeness, and size; and determining the at least one face image in the optical static image and the coordinates of the face image, in a case where the image quality satisfies a preset quality standard.

In the embodiment of the present application, accuracy of face recognition is improved by screening out a static image whose image quality meets a preset quality standard, thereby improving accuracy of body temperature detection In an implementation, the face recognition is performed in a key point location technology, to locate multiple key points of facial features and contours.

In the embodiment of the present application, face recognition is realized efficiently and accurately by employing the key point location technology.

In an implementation, the thermal imaging information of the face image includes: a temperature dot matrix corresponding to the face image, in the thermal imaging static image; and the determining the body temperature corresponding to the face image, according to the thermal imaging information of the face image includes: performing a calculation on the temperature dot matrix employing a linear regression algorithm, to obtain the body temperature corresponding to the face image.

In the embodiment of the present application, a calculation is performed on the temperature dot matrix by employing a linear regression algorithm, so that the body temperature corresponding to the face image can be accurately determined.

In an implementation, the temperature dot matrix includes temperatures indicated by pixels corresponding to a frontal position of the face image in the thermal imaging static image.

In an implementation, demonstrating the face image corresponding to the body temperature that is higher than a predetermined threshold.

In an implementation, storing a person identification corresponding to the face image in advance; and demonstrating the person identification of the face image corresponding to the body temperature that is higher than a predetermined threshold.

In the embodiment of the present application, by demonstrating the face image or the person identification corresponding to the body temperature higher than a predetermined threshold, a person with an abnormal body temperature can be notified or displayed quickly and efficiently.

In a second aspect, a device for detecting a body temperature is provided according to an embodiment of the application, which includes:

a face recognition module, configured to perform face recognition on an optical static image to determine at least one face image in the optical static image and coordinates of the face image;

a coordinate transformation module, configured to perform coordinate transformation on a thermal imaging static image andlor the optical static image, to determine thermal imaging information of the face image, wherein the optical static image and the thermal imaging static image include a same image acquisition target with a same face; and a body temperature determining module, configured to determine a body temperature corresponding to the face image, according to the thermal imaging information of the face image.

In an implementation, the device further includes:

a static image obtaining module, configured to extract frames at a same moment from an optical video image and a thermal imaging video image respectively, to obtain the optical static image and the thermal imaging static image.

In an implementation, the face recognition module includes:

a screening sub-module, configured to determine image quality of the optical static image according to sharpness of the optical static image and face sharpness in the optical static image, wherein the face sharpness includes at least one of following characteristics: blocking degree, ambiguity, light intensity, attitude angle, completeness, and size; and a face image determining sub-module, configured to determine the at least one face image in the optical static image and the coordinates of the face image, in a case where the image quality satisfies a preset quality standard.

In an implementation, the face recognition module is further configured to perform the face recognition in a key point location technology, to locate multiple key points of facial features and contours.

In an implementation, the thermal imaging information of the face image includes: a temperature dot matrix corresponding to the face image, in the thermal imaging static image; and the body temperature determining module is configured to perform a calculation on the temperature dot matrix employing a linear regression algorithm, to obtain the body temperature corresponding to the face image.

In an implementation, the temperature dot matrix includes temperatures indicated by pixels corresponding to a frontal position of the face image, in the thermal imaging static image.

In an implementation, the device further includes:

a first demonstrating module, configured to demonstrate the face image corresponding to the body temperature that is higher than a predetermined threshold.

In an implementation, the device further includes:

a second demonstrating module, configured to store a person identification corresponding to the face image in advance, and demonstrate the person identification of the face image corresponding to the body temperature that is higher than a predetermined threshold.

In a third aspect, an electronic apparatus is provided according to an embodiment of the application, which includes:

at least one processor; and a memory communicatively connected with the at least one processor, wherein the memory stores instructions executable by the at least one processor, and the instructions, when executed by the at least one processor, cause the at least one processor to implement the method of any one of the embodiments in the first aspect of the present application.

In a fourth aspect, a non-transitory computer-readable storage medium storing computer executable instructions, wherein the executable instructions, when executed by a computer, causes the computer to implement the method of any one of the embodiments in the first aspect of the present application.

One of the above embodiments in the application has the following advantages or beneficial effects: in the embodiment of the present application, body temperatures corresponding to multiple face images is determined by determining multiple face images in an ordinary optical image and determining thermal imaging information corresponding to the face images, in a thermal imaging image, thereby improving efficiency of body temperature detection in public places and preventing cross infection.

Other effects of the foregoing optional manners will be described below in conjunction with specific embodiments.

BRIEF DESCRIPTION OF THE DRAWINGS

The drawings are used to better understand the solution, and do not constitute a limitation on the application, wherein.

DETAILED DESCRIPTION

With reference to the accompanying drawings, exemplary embodiments of the present application are described below which include various details of the embodiments of the present application to facilitate understanding and should be considered as merely exemplary. Therefore, those ordinary skilled in the art should recognize that various changes and modifications can be made to the embodiments described herein without departing from the scope and spirit of the application. Also, for clarity and conciseness, descriptions for known functions and structures are omitted in the following description.

Figure 1:
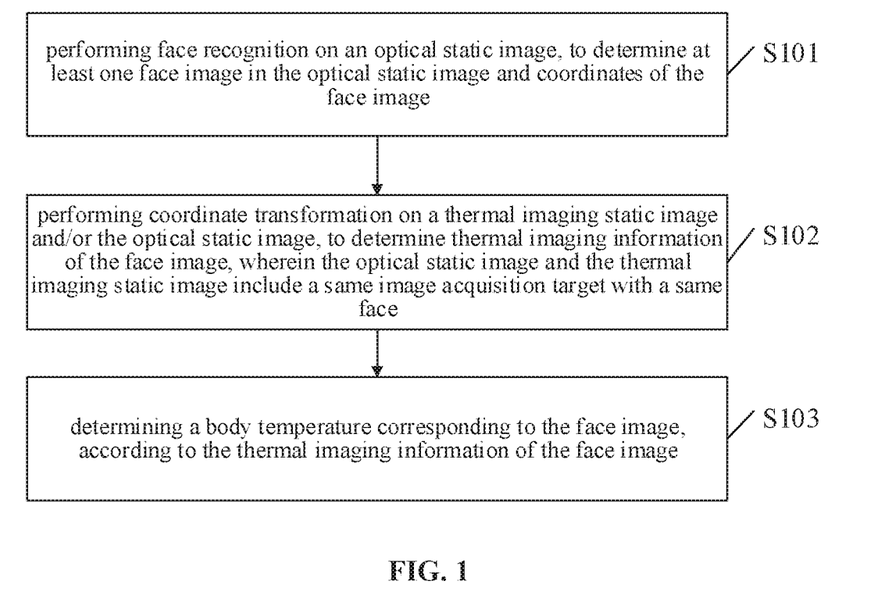
FIG. 1 is a first flow chart of an implementation of a method for detecting a body temperature according to an embodiment of the present application.

A multi-body temperature detection method is provided according to an embodiment of the present application. FIG. 1 is a flowchart of an implementation of a method for detecting a body temperature according to an embodiment of the present application, and the method includes:

S101, performing face recognition on an optical static image, to determine at least one face image in the optical static image and coordinates of the face image;

S102, performing coordinate transformation on a thermal imaging static image and/or the optical static image, to determine thermal imaging information of the face image, wherein the optical static image and the thermal imaging static image include a same image acquisition target with a same face; and S103, determining a body temperature corresponding to the face image, according to the thermal imaging information of the face image.

Figure 2:
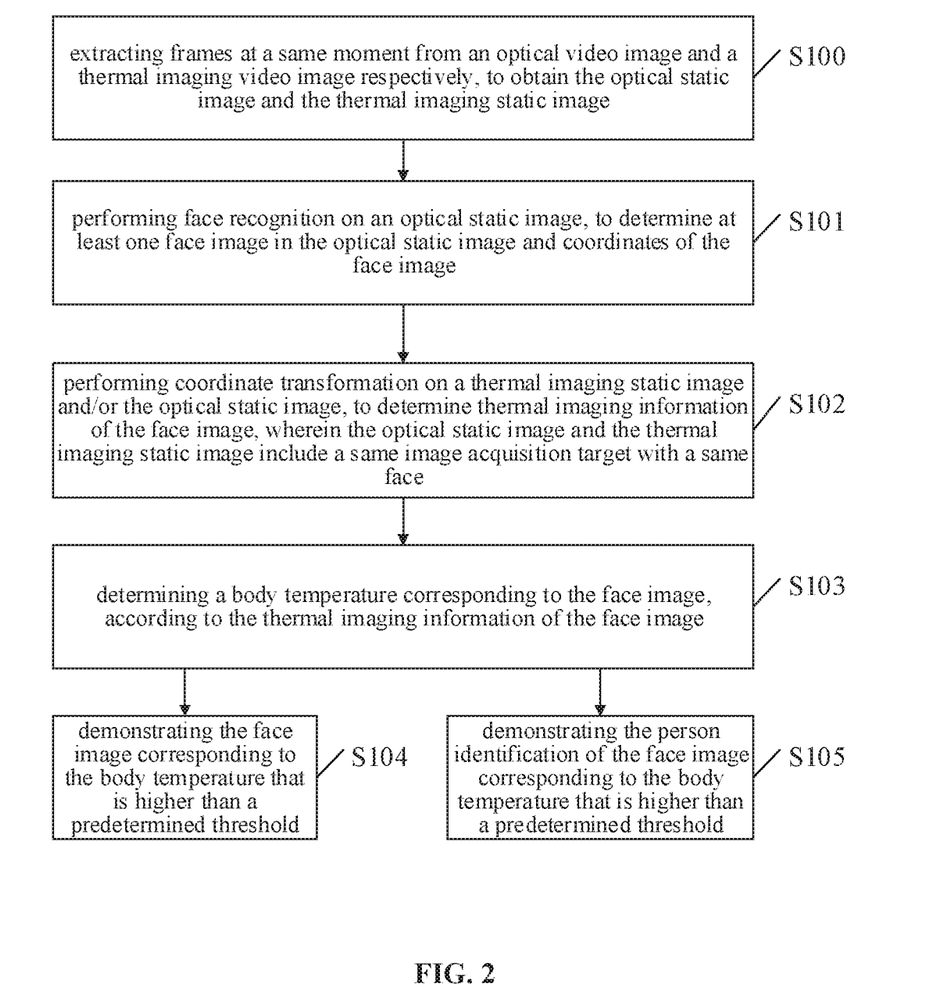
FIG. 2 is a second flow chart of an implementation of a method for detecting a body temperature according to an embodiment of the present application.

As shown in FIG. 2, in a possible implementation, the above method further includes:

S100, extracting frames at a same moment from an optical video image and a thermal imaging video image respectively, to obtain the optical static image and the thermal imaging static image.

In the embodiment of the present application, an optical camera and a thermal imaging camera (such as an infrared camera) may be disposed at the same position, and the optical camera and the thermal imaging camera are oriented in the same direction, to ensure that the optical camera and the thermal imaging camera can collect video images at the same position. In the above S100, frames at the same moment are extracted from the optical video image and the corresponding thermal imaging video image respectively, to obtain the extracted optical static image and extracted thermal imaging static image with the same image acquisition target.

In this embodiment of the present application, multiple sets of optical cameras and thermal imaging cameras may be provided, and each set includes one optical camera and one thermal imaging camera that are disposed at the same position and oriented in the same direction, so as to collect images of the crowd in different positions.

In a possible implementation, the above S101 includes: determining image quality of the optical static image according to sharpness of the optical static image and face sharpness in the optical static image, wherein the face sharpness includes at least one of following characteristics: blocking degree, ambiguity, light intensity, attitude angle, completeness, and size; and determining the at least one face image in the optical static image and coordinates of the face image, in the case where the image quality satisfies a preset quality standard.

Optionally, the above determination of the sharpness of the optical static image may include determining whether there is a moire pattern and/or an imaging abnormality and so on.

In a possible implementation, in S101, the face recognition is performed in a key point location technology, to locate multiple key points of facial features and contours. Optionally, 150 key points of the facial features and contours, such as cheeks, eyebrows, eyes, a mouth and a nose, may be located. Moreover, the embodiments of the present application may also be combined with a human body recognition technology to perform human body positioning. Recognition and marking of multiple faces at the same time are supported in the embodiments of the present application.

In a possible implementation, in S102, coordinate transformation is performed on the thermal imaging static image and/or the optical static image. A predetermined coordinate transformation algorithm may be used to calibrate the face image and the thermal imaging static image, and the face image in the optical static image is bound to its corresponding temperature information.

As the sizes of the optical static image and the thermal imaging static image are likely different, in order to determine parts of the thermal imaging static image corresponding to respective face images in the optical static image, the coordinate transformation may be performed on the thermal imaging static image and/or the optical static image in the embodiment of the present application.

For example, the size of the optical static image P1 is X1×Y1, and the size of the corresponding thermal imaging static image P2 is X2×Y2.

In this case, if coordinates of a pixel p1 of one face image in P1 are known as (x1, y1), the coordinate transformation is performed on P1, to determine that coordinates of a pixel (denoted as p2) corresponding to the pixel p1, in the thermal imaging image P2 are (x1×X2/X1, y1×Y2/Y1).

Or, if coordinates of a pixel p2 in P2 are known as (x2, y2), the coordinate transformation is performed on P2, to determine that coordinates of a pixel (denoted as p1) corresponding to the pixel p2, in the optical static image P1 are (x2×X1/X2, y2×Y1/Y2).

By performing the above coordinate transformation operation on each pixel point, the thermal imaging information of each face image in the optical static image can be determined, that is, the thermal imaging information of the face image, at the corresponding position in the thermal imaging static image, In a possible implementation, the thermal imaging information of the face image includes: a temperature dot matrix corresponding to the face image, in the thermal imaging static image; and the determining the body temperature corresponding to the face image, according to the thermal imaging information of the face image includes: performing a calculation on the temperature dot matrix employing a linear regression algorithm, to obtain the body temperature corresponding to the face image.

Optionally, the above-mentioned temperature dot matrix includes temperatures indicated by pixels corresponding to the frontal position of the face image, in the thermal imaging static image.

For example, each face image corresponds to a temperature dot matrix, and the temperature dot matrix includes temperatures indicated by a plurality of pixels at a frontal position of the face image, in a thermal imaging static image. For example, a frontal position of a person's face image has n pixels in the thermal imaging static image, wherein a temperature indicated by a pixel p1 is 36.1 degrees Celsius, a temperature indicated by a pixel p2 is 36.2 degrees Celsius, . . . , a temperature indicated by a pixel pn is 36.1 degrees Celsius. In the embodiment of the present application, the temperature of the frontal position of the face image may be calculated by employing a linear regression algorithm, and this temperature may represent a body temperature corresponding to the face image.

Compared with the averaging method for calculating a body temperature, a linear regression algorithm according to the embodiment of the present application is employed to determine the body temperature, so that a body temperature of a person can be determined more accurately.

In a possible implementation, as shown in FIG. 2, in the embodiment of the present application, the method may further include:

S104, demonstrating the face image corresponding to the body temperature that is higher than a predetermined threshold, In this way, in the embodiment of the present application, accurate multi-body temperature detection and face screening can be achieved. A warning can be easily given in the case where a set threshold temperature is exceeded, and can be demonstrated on a web page.

In a possible implementation, a person identification corresponding to the face image may be stored in advance. Accordingly, as shown in FIG. 2, in the embodiment of the present application, the method may further include:

S105, demonstrating the person identification of the face image corresponding to the body temperature that is higher than a predetermined threshold.

In the embodiment of the present application, the current temperatures of the crowd are recognized through cameras and displayed in a real-time video stream on a large screen in the field, realizing timely feedback according to contents of the current personnel situation and giving a warning for a person with an abnormal/high temperature. In addition, in the embodiment of the present application, global data can be demonstrated to an institutional department, the global data including the cumulative/daily tested number of people and the cumulative/daily number of people with high temperatures in each checkpoint. The embodiment of the present application may also employ a refined map, which can be connected to an intranet of an organization such as an enterprise, and employ intranet data for face recognition, and feed back temperature test results to an enterprise's internal office system or webpage system.

Figure 3:
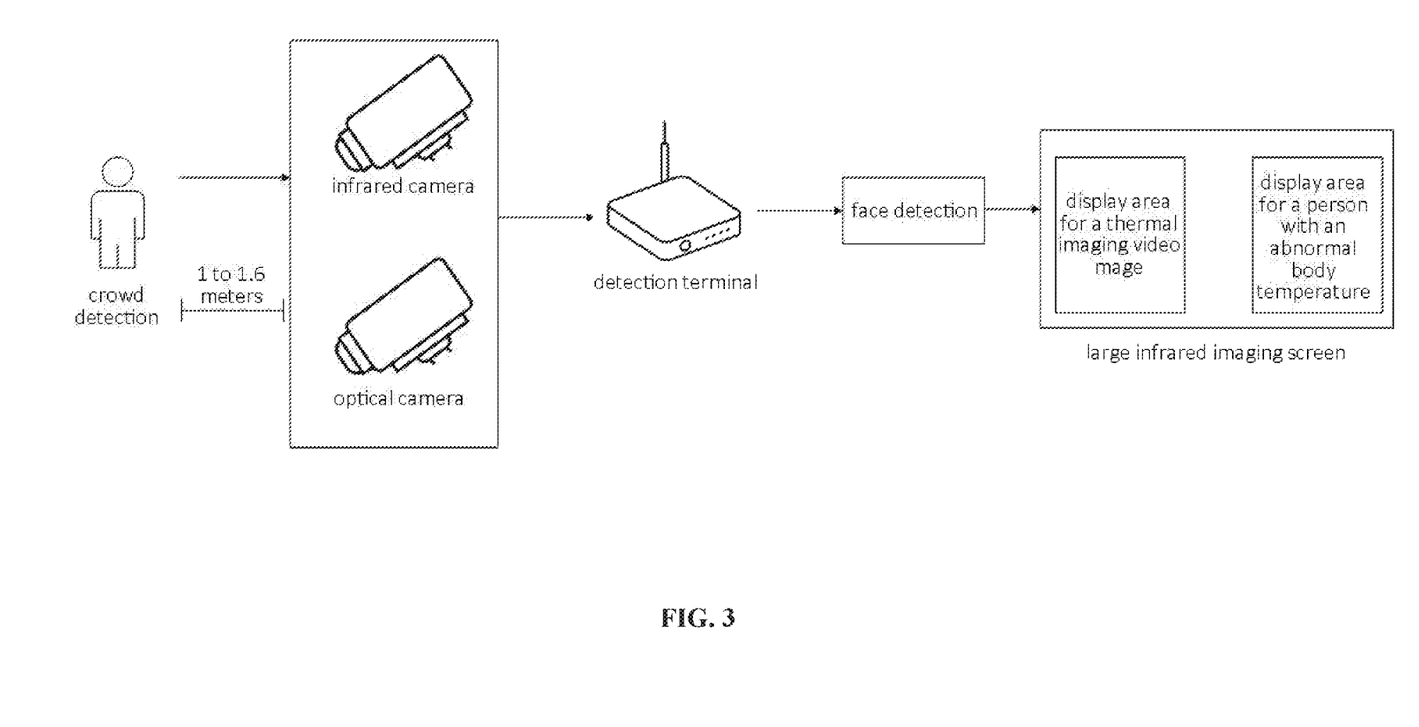
FIG. 3 is a schematic diagram of an implementation scenario of a method for detecting a body temperature according to an embodiment of the present application.

FIG. 3 is a schematic diagram of an implementation scenario of a method for detecting a body temperature according to an embodiment of the present application. As shown in FIG. 3. an optical camera and a thermal imaging camera (such as an infrared camera) are disposed at the same position. The two cameras are oriented at the same direction and the distance from the two cameras to the crowd is in a range of 1 to 1.6 meters. The optical camera can accurately locate a face, including 150 key points of facial features and contours such as cheeks, eyebrows, eyes, a mouth and a nose. AI detection technology (including face detection/ human body tracking) is performed by a detection terminal on an optical static image in an optical video image captured by the optical camera. Then the optical static image and the thermal imaging static image in the thermal imaging video image captured by the thermal imaging camera are integrated to form a perfect rapid body temperature detection solution for the crowd. In such a manner, a person with an abnormal body temperature is found and a warning is actively given. In addition, the person with the abnormal body temperature may be displayed on a screen, and a thermal imaging video image (such as an infrared video image) may be displayed on the screen at the same time. For the person with the abnormal body temperature, secondary detection can be carried out in combination with a forehead thermometer to improve detection efficiency.

Figure 4:
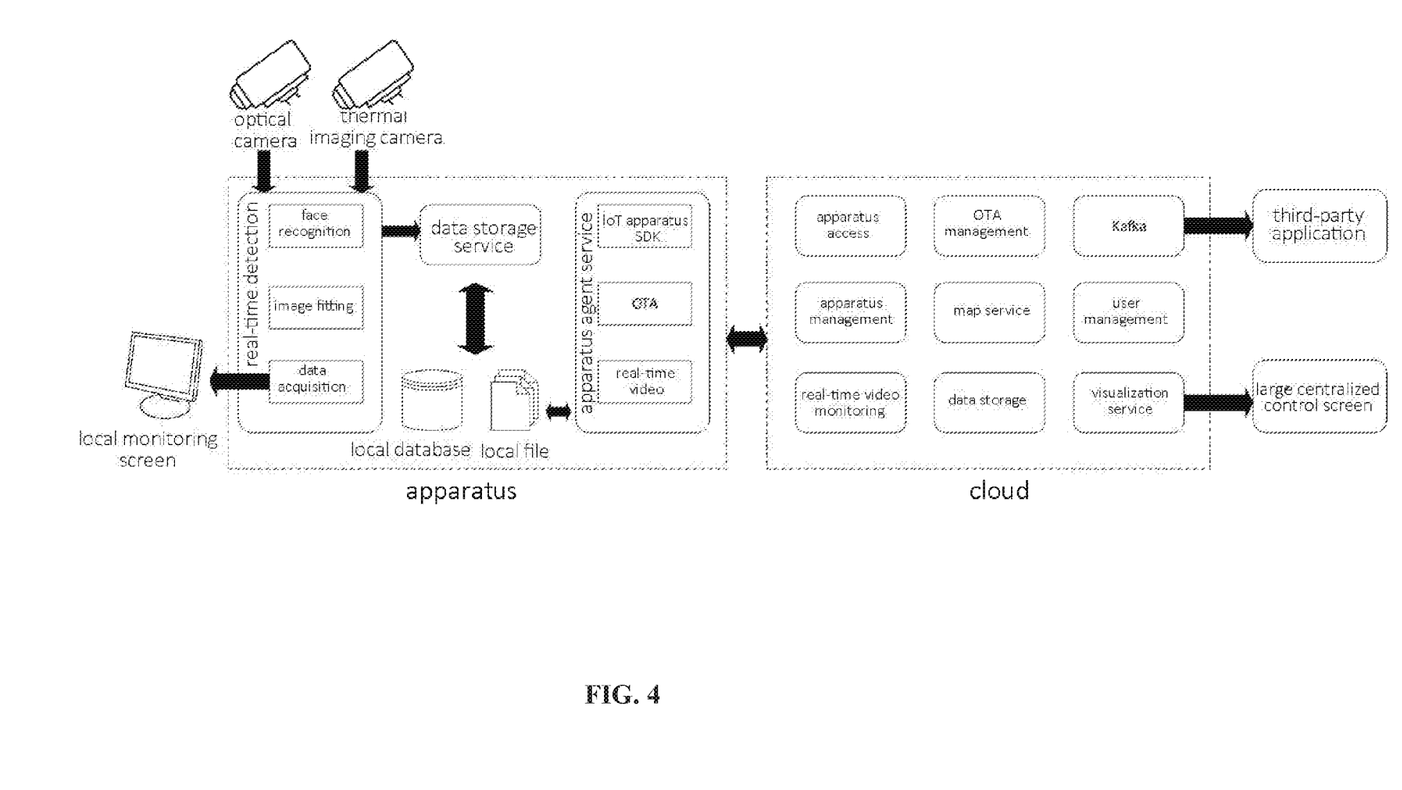
FIG. 4 is a schematic diagram of a technical architecture of a method for detecting a body temperature according to an embodiment of the present application.

FIG. 4 is a schematic diagram of a technical architecture of a method for detecting a body temperature according to an embodiment of the present application. As shown in FIG. 4, the system may include at least cameras(including an optical camera and a thermal imaging camera), an apparatus, a cloud, a third-party application, and a centralized control large screen. An optical camera and a thermal imaging camera are used to take an optical video image and a thermal imaging video image respectively, and the images are displayed on a local monitoring screen. A real-time detection module of the apparatus performs data extraction and face recognition on the optical static image in the optical video image, and performs image fitting on the optical static image and the corresponding thermal imaging static image, to determine a body temperature corresponding to each of the face images in the optical static image, and store the body temperature locally. Through an apparatus agent service module of the apparatus, data such as body temperatures and real-time videos can be uploaded to the cloud. The cloud performs summarization and analyzation of the data reported by each apparatus, including centralized transmission and management of the data and the like. The cloud can send the summarized and analyzed data to a third-party application to provide a third-party with a temperature detection service; or, the cloud can display the summarized data and the related images on a large centralized control screen.

In addition, the cloud is also responsible for functions such as configuration delivery and software upgrade for each apparatus. Each apparatus employs the Internet of Things (IoT) apparatus software development kit (SDK) module and over-the-air (OTA) module to interact with the cloud. The cloud is specifically responsible for functions such as apparatus access, apparatus management, real-time video monitoring, map service, data storage, visualization service and user management, and employs the OTA module and kafka module to achieve interaction with the apparatus.

Figure 5:
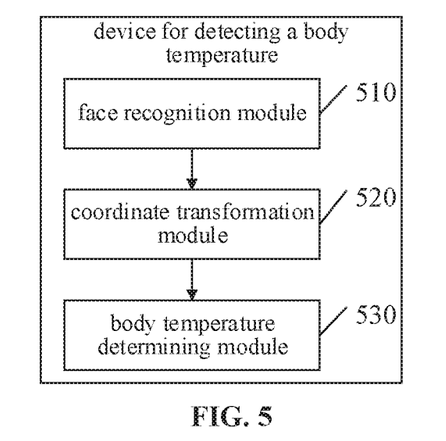
FIG. 5 is a first schematic structural diagram of a device for detecting a body temperature according to an embodiment of the present application.

A device for detecting a body temperature is provided according to an embodiment of the present application. FIG. 5 is a schematic structural diagram of a device for detecting a body temperature according to an embodiment of the present application, and the device includes:

a face recognition module 510, configured to perform face recognition on an optical static image, to determine at least one face image in the optical static image and coordinates of each of the face image;

a coordinate transformation module 520, configured to perform coordinate transformation on a thermal imaging static image and/or the optical static image, to determine thermal imaging information of the face image, wherein the optical static image and the thermal imaging static image include a same image acquisition target with a same face; and a body temperature determining module 530, configured to determine a body temperature corresponding to the face image, according to the thermal imaging information of the face image.

Figure 6:
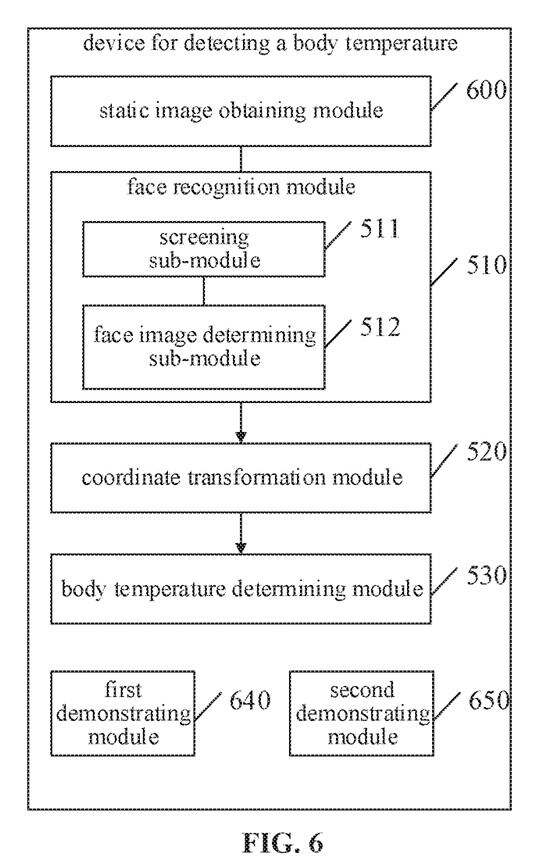
FIG. 6 is a second schematic structural diagram of a device for detecting a body temperature according to an embodiment of the present application.

As shown in FIG. 6, in a possible implementation, the above device further includes:

a static image obtaining module 600, configured to extract frames at a same moment from an optical video image and a thermal imaging video image respectively, to obtain the optical static image and the thermal imaging static image.

In a possible implementation, the face recognition module 510 includes:

a screening sub-module 511, configured to determine image quality of the optical static image according to sharpness of the optical static image and face sharpness in the optical static image, wherein the face sharpness includes at least one of following characteristics: blocking degree, ambiguity, light intensity, attitude angle, completeness, and size; and a face image determining sub-module 512, configured to determine at least one face image in the optical static image and the coordinates of the face image, in a case where the image quality satisfies a preset quality standard.

In a possible implementation, the face recognition module 510 is further configured to perform the face recognition in a key point location technology, to locate multiple key points of facial features and contours.

In a possible implementation, the thermal imaging information of the face image includes: a temperature dot matrix corresponding to the face image, in the thermal imaging static image; and the body temperature determining module 530 is configured to perform a calculation on the temperature dot matrix employing a linear regression algorithm, to obtain the body temperature corresponding to the face image.

In a possible implementation, the temperature dot matrix includes temperatures indicated by pixels corresponding to a frontal position of the face image, in the thermal imaging static image.

As shown in FIG. 6, in a possible implementation, the above device further includes:

a first demonstrating module 640, configured to demonstrate the face image corresponding to the body temperature that is higher than a predetermined threshold.

Optionally, the above device further includes:

a second demonstrating module 650, configured to store a person identification corresponding to the face image in advance, and demonstrate the person identification of the face image corresponding to the body temperature that is higher than a predetermined threshold.

In this embodiment, functions of modules in the device refer to the corresponding description of the above mentioned method and thus the description thereof is omitted herein.

In summary, the method and device proposed in the embodiments of the present application can determine body temperatures corresponding to multiple face images by determining multiple face images in an ordinary optical image and determining the thermal imaging information corresponding to the face image, in the thermal imaging image, thereby improving efficiency of body temperature detection in public places and preventing cross infection. In the embodiments of the present application, static images can be selected from the real-time video images, and used for body temperature detection.

According to embodiments of the present application, an electronic apparatus and a readable storage medium are provided.

Figure 7:
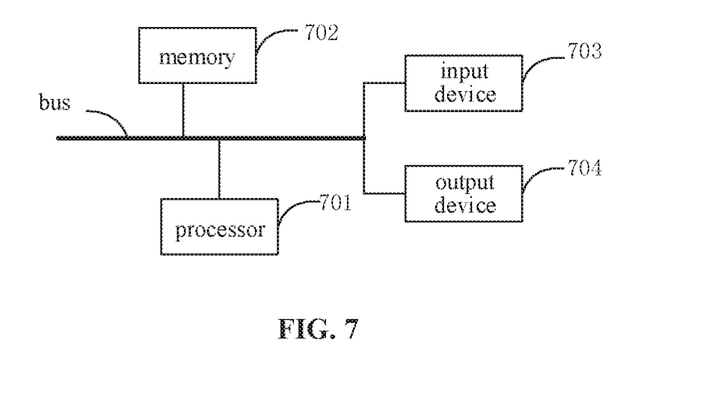
FIG. 7 is a block diagram of an electronic apparatus for implementing a method for detecting a body temperature according to an embodiment of the present application

FIG. 7 shows a block diagram of an electronic apparatus for implementing a method for detecting a body temperature according to an embodiment of the present application. The electronic apparatus are intended to represent various forms of digital computers, such as laptop computers, desktop computers, workbenches, personal digital assistants, servers, blade servers, mainframe computers, and other suitable computers. Electronic apparatus may also represent various forms of mobile devices, such as personal digital assistants, cellular phones, intelligent phones, wearable devices, and other similar computing devices. The components shown here, their connections and relationships, and their functions are merely examples, and are not intended to limit the implementation of the application described and/or required herein.

As shown in FIG. 7, the electronic apparatus includes: one or more processors 701, a memory 702, and interfaces for connecting various components, including a high-speed interface and a low-speed interface. The various components are interconnected via different buses and can be mounted on a common motherboard or otherwise installed as required. The processor may process instructions executable within the electronic apparatus, including instructions stored in or on a memory, for displaying graphic information of a graphical user interface (GUI) on an external input/output device (such as a display device coupled to the interface). In other embodiments, multiple processors andlor multiple buses can be used with multiple memories and multiple memories, if desired. Similarly, multiple electronic apparatus can be connected, each providing some of the necessary operations (for example, as a server array, a group of blade servers, or a multiprocessor system). A processor 701 is taken as an example in FIG. 7.

The memory 702 is a non-transitory computer-readable storage medium according to an embodiment of the present application. The memory stores instructions executable by at least one processor, and the instructions, when executed by the at least one processor, cause the at least one processor to implement the method according to the above embodiments of the present application. The non-transitory computer-readable storage medium of the present application stores computer executable instructions, wherein the executable instructions, when executed by a computer, cause the computer to implement the method according to the above embodiments of the present application.

As a non-transitory computer-readable storage medium, the memory 702 can be used to store non-transitory software programs, non-transitory computer executable programs and modules, such as program instructions/modules corresponding to the infrared temperature measurement and calibration method in the embodiments of the present application (for example, the face recognition module 510, the coordinate transformation module 520, the body temperature determining module 530 shown in FIG. 5). The processor 701 executes various functional applications and data processing of the server by running non-transitory software programs, instructions, and modules stored in the memory 702, that is, the method according to the above embodiments of the present application can be implemented.

The memory 702 may include a storage program area and a storage data area, where the storage program area may store an operating system and an application program required for at least one function; the storage data area may store data created according to the use of the electronic device for infrared temperature measurement and calibration, etc. In addition, the memory 702 may include a high-speed random access memory, and may also include a non-transitory memory, such as at least one magnetic disk storage device, a flash memory device, or other non-transitory solid-state storage device. In some embodiments, the memory 702 may optionally include a memory remotely set relative to the processor 701, and these remote memories may be connected to the electronic apparatus for infrared temperature measurement and calibration, through a network. Examples of the above network include, but are not limited to, the Internet, an intranet, a local area network, a mobile communication network, and a combination thereof.

The electronic apparatus may further include an input device 703 and an output device 704. The processor 701, the memory 702, the input device 703, and the output device 704 may be connected through a bus or in other manners. in FIG. 7, the connection through the bus is taken as an example.

The input device 703 can receive input numeric or character information, and generate key signal inputs related to user settings and function control of an electronic apparatus for infrared temperature measurement and calibration, such as a touch screen, a keypad, a mouse, a trackpad, a touchpad, a pointing stick, one or more mouse buttons, a trackball, a joystick and other input devices. The output device 704 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various implementations of the system and technology described herein can be implemented in a digital electronic circuit systems, an integrated circuit system, an application specific integrated circuits (ASIC), a computer hardware, a firmware, a software, and/or a combination thereof. These various implementations may include: implementation in one or more computer programs executable on and/or interpretable on a programmable system including at least one programmable processor, which may be a dedicated or general-purpose programmable processor that may receive data and instructions from a storage system, at least one input device, and at least one output device, and transmit the data and instructions to the storage system, the at least one input device, and the at least one output device.

These computing programs (also known as programs, software, software applications, or codes) include machine instructions of a programmable processor and can be implemented using high-level procedural and/or object-oriented programming languages, and/or assembly/machine languages. As used herein, the terms "machine-readable medium" and "computer-readable medium" refer to any computer program product, apparatus, and/or device used to provide machine instructions and/or data to a programmable processor (for example, a magnetic disk, an optical disk, a memory, and a programmable logic device (PLD)), including machine-readable media that receives machine instructions as machine-readable signals. The term "machine-readable signal" refers to any signal used to provide machine instructions and/or data to a programmable processor.

In order to provide interaction with the user, the system and technique described herein may be implemented on a computer having a display device (for example, a Cathode Ray Tube (CRT) or liquid crystal display (LCD) monitor) for displaying information to the user; and a keyboard and pointing device (such as a mouse or trackball) through which the user can provide input to a computer. Other kinds of devices may also be used to provide interaction with the user; for example, the feedback provided to the user may be any form of sensory feedback (for example, visual feedback, auditory feedback, or haptic feedback); and may be in any form (including acoustic input, voice input, or tactile input) to receive input from the user.

The system and technology described herein can be implemented in a computing system including background components (for example, as a data server), or a computing system including middleware components (for example, an application server), or a computing system including front-end components (for example, a user computer with a graphical user interface or a web browser, through which the user can interact with the implementation of the system and technology described herein), or a computing system including any combination of such background components, middleware components, and front-end components. The components of the system may be interconnected by any form or medium of digital data communication (for example, a communication network). Examples of the communication network include: a local area network (LAN), a wide area network (WAN), and the Internet.

The computer system may include a client and a server. The client and server are generally remote from each other and typically interact through a communication network. A client-server relationship is generated by computer programs running on the respective computers and having the client-server relationship with each other.

It should be understood that the various forms of processes shown above can be used to reorder, add, or delete steps. For example, the steps described in this application can be executed in parallel, sequentially, or in different orders. As long as the desired results of the technical solutions disclosed in this application can be achieved, there is no limitation herein.

The foregoing specific implementations do not constitute a limitation on the protection scope of the present application. It should be understood by those skilled in the art that various modifications, combinations, sub-combinations, and substitutions may be made according to design requirements and other factors. Any modification, equivalent replacement and improvement made within the spirit and principle of this application shall be included in the protection scope of this application.

What is claimed is:

1. A method for detecting a body temperature, comprising:
    acquiring an optical video image and a thermal imaging video image by an optical camera and a thermal imaging camera disposed at a same position and oriented in a same direction, respectively;
    extracting frames at a same moment from the optical video image and the thermal imaging video image respectively, to obtain an optical static image and a thermal imaging static image;
    performing face recognition on the optical static image, to determine at least one face image in the optical static image and coordinates of the face image;
    performing coordinate transformation on the thermal imaging static image and the optical static image, to determine thermal imaging information of the face image in the optical static image, at a corresponding position in the thermal imaging static image, wherein the optical static image and the thermal imaging static image comprise a same image acquisition target with a same face; and
    determining a body temperature corresponding to the face image, according to the thermal imaging information of the face image.

2. The method according to claim 1, wherein the performing face recognition on an optical static image, to determine at least one face image in the optical static image and coordinates of the face image:
    determining image quality of the optical static image according to sharpness of the optical static image and face sharpness in the optical static image, wherein the face sharpness comprises at least one of following characteristics: blocking degree, ambiguity, light intensity, attitude angle, completeness, and size; and
    determining the at least one face image in the optical static image and the coordinates of the face image, in a case where the image quality satisfies a preset quality standard.

3. The method according to claim 1, wherein the face recognition is performed in a key point location technology, to locate multiple key points of facial features and contours.

4. The method according to claim 1, wherein
    the thermal imaging information of the face image comprises: a temperature dot matrix corresponding to the face image, in the thermal imaging static image; and
    the determining the body temperature corresponding to the face image, according to the thermal imaging information of the face image comprises: performing a calculation on the temperature dot matrix employing a linear regression algorithm, to obtain the body temperature corresponding to the face image.

5. The method according to claim 4, wherein the temperature dot matrix comprises temperatures indicated by pixels corresponding to a frontal position of the face image, in the thermal imaging static image.

6. The method according to claim 1, further comprising: demonstrating the face image corresponding to the body temperature that is higher than a predetermined threshold.

7. The method according to claim 1, further comprising: storing a person identification corresponding to the face image in advance; and
demonstrating the person identification of the face image corresponding to the body temperature that is higher than a predetermined threshold.

8. A device for detecting a body temperature, comprising: one or more processors; and
a storage device configured to store one or more programs, wherein
the one or more programs, when executed by the one or more processors, cause the one or more processors to:
acquire an optical video image and a thermal imaging video image by an optical camera and a thermal imaging camera disposed at a same position and oriented in a same direction, respectively;
extract frames at a same moment from the optical video image and the thermal imaging video image respectively, to obtain an optical static image and a thermal imaging static image;
perform face recognition on the optical static image, to determine at least one face image in the optical static image and coordinates of the face image;
perform coordinate transformation on the thermal imaging static image and the optical static image, to determine thermal imaging information of the face image in the optical static image, at a corresponding position in the thermal imaging static image, wherein the optical static image and the thermal imaging static image comprise a same image acquisition target with a same face; and
determine a body temperature corresponding to the face image, according to the thermal imaging information of the face image.

9. The device according to claim 8, wherein the one or more programs, when executed by the one or more processors, cause the one or more processors further to:
determine image quality of the optical static image according to sharpness of the optical static image and face sharpness in the optical static image, wherein the face sharpness comprises at least one of following characteristics: blocking degree, ambiguity, light intensity, attitude angle, completeness, and size; and
determine the at least one face image in the optical static image and the coordinates of the face image, in a case where the image quality satisfies a preset quality standard.

10. The device according to claim 8, wherein the one or more programs, when executed by the one or more processors, cause the one or more processors further to perform the face recognition in a key point location technology, to locate multiple key points of facial features and contours.

11. The device according to claim 8, wherein
the thermal imaging information of the face image comprises: a temperature dot matrix corresponding to the face image, in the thermal imaging static image; and
the one or more programs, when executed by the one or more processors, cause the one or more processors further to perform a calculation on the temperature dot matrix employing a linear regression algorithm, to obtain the body temperature corresponding to the face image.

12. The device according to claim 11, wherein the temperature dot matrix comprises temperatures indicated by pixels corresponding to a frontal position of the face image, in the thermal imaging static image.

13. The device according to claim 8, wherein the one or more programs, when executed by the one or more processors, cause the one or more processors further to:
demonstrate the face image corresponding to the body temperature that is higher than a predetermined threshold.

14. The device according to claim 8, wherein the one or more programs, when executed by the one or more processors, cause the one or more processors further to:
store a person identification corresponding to the face image in advance, and demonstrate the person identification of the face image corresponding to the body temperature that is higher than a predetermined threshold.

15. A non-transitory computer-readable storage medium storing computer executable instructions, wherein the executable instructions, when executed by a computer, cause the computer to:
acquire an optical video image and a thermal imaging video image by an optical camera and a thermal imaging camera disposed at a same position and oriented in a same direction, respectively;
extract frames at a same moment from the optical video image and the thermal imaging video image respectively, to obtain an optical static image and a thermal imaging static image;
perform face recognition on the optical static image, to determine at least one face image in the optical static image and coordinates of the face image;
perform coordinate transformation on the thermal imaging static image and the optical static image, to determine thermal imaging information of the face image in the optical static image, at a corresponding position in the thermal imaging static image, wherein the optical static image and the thermal imaging static image comprise a same image acquisition target with a same face; and
determine a body temperature corresponding to the face image, according to the thermal imaging information of the face image.

16. The non-transitory computer-readable storage medium according to claim 15, wherein the executable instructions, when executed by the computer, cause the computer further to:
determine image quality of the optical static image according to sharpness of the optical static image and face sharpness in the optical static image, wherein the face sharpness comprises at least one of following characteristics: blocking degree, ambiguity, light intensity, attitude angle, completeness, and size; and
determine the at least one face image in the optical static image and the coordinates of the face image, in a case where the image quality satisfies a preset quality standard.

17. The non-transitory computer-readable storage medium according to claim 15, wherein the executable instructions, when executed by the computer, cause the computer further to perform the face recognition in a key point location technology, to locate multiple key points of facial features and contours.

* * * * *